Patented Aug. 23, 1949

2,480,072

UNITED STATES PATENT OFFICE 2,480,072

PREPARATION OF QUINONES

William M. Ziegler, Clementon, N. J.

No Drawing. Application March 8, 1946,
Serial No. 653,168

7 Claims. (Cl. 260—396)

This invention relates to the production of naphthoquinones and is more particularly concerned with a method for the oxidation of 1-hydroxy-2-($C_nH_{2n+1}$)-naphthalenes to 2-($C_nH_{2n+1}$)-naphthoquinones, wherein "$n$" represents an integer from one to ten, inclusive.

It has been suggested that hypertension existing in cases of renal ischemia may be due to the formation of pressor amines in the kidneys. This formation of pressor amines is caused by faulty metabolism of certain amino acids. Normally, these pressor amines are deaminized by amino enzymes and are thus made inactive. However, in the case of an ischemic kidney, the amino enzymes are inactive and the pressor amines accumulate and may cause hypertension. It has been shown that certain quinones, 2-alkyl-1,4-naphthoquinones, for example, are capable of inactivating pressor amines and are useful in effectively reducing the blood pressure in hypersensitive individuals.

I have found that I am able to produce 2-alkyl-1,4-naphthoquinones by the controlled oxidation of a 1-hydroxy-2-alkyl-naphthalene.

I have found that the production of 2-alkyl-naphthoquinones can simply and effectively be accomplished by adding a mixture of a 1-hydroxy-2-alkyl-naphthalene in a solvent such as glacial acetic acid to an aqueous solution of an oxidizing agent, such as aqueous chromic anhydride or benzoyl peroxide. I want to point out that the above-mentioned operation is especially critical and, while I am able to obtain a small yield (about 15 per cent of theory) of the desired product by adding the oxidizing agent such as chromic anhydride to the mixture of aliphatic acid and 1-hydroxy-2-alkyl-naphthalene, I am able to obtain a much higher yield (about 60.0 per cent of theory) when the mixture of 1-hydroxy-2-alkyl-naphthalene and acetic acid is added to the aqueous chromic anhydride. The addition of the naphthalene reactant to the oxidizing agent may best be conducted portion-wise or at a uniform slow rate. The addition of the naphthalene reactant is continued until the final ratio of the reactants is preferably between about 1.5 and about 2.0 moles of oxidizing agent such as aqueous chromic anhydride per mole of 1-hydroxy-2-alkyl-naphthalene. An excess of the oxidizing agent over that theoretically necessary to oxidize all of the hydroxy-2-alkyl-naphthalene to the quinone is always maintained. The temperature of the reaction mixture is maintained in a range between about zero degrees and about 80 degrees centigrade. While I am able to operate at the temperature range above-noted, I prefer to operate in a range between about 15 and about 55 degrees centigrade, and a temperature in a range between about 35 and about 50 degrees centigrade is most desirable. The reaction is exothermic and cooling is necessary to maintain the desired temperature.

The following examples illustrate my invention but are not to be construed as limiting the same:

Example 1

Ninety-five grams of chromic anhydride ($CrO_3$) in aqueous solution at room temperature was placed in a stainless steel reactor provided with a cooling coil and stirrer. A mixture of 100 grams of 1-hydroxy-2-methyl-naphthalene dissolved in glacial acetic acid was slowly added at room temperature. The reaction was exothermic and the temperature within the reaction zone was maintained between about 40 and about 45 degrees centigrade by circulation of water through the cooling coil. The reaction product was withdrawn from the vessel and 65.0 grams of 2-methyl-1,4-naphthoquinone was separated therefrom. This amounts to a yield of 60.0 per cent of theory.

Example 2

One hundred ninety-one grams of 1-hydroxy-2-isopropyl-naphthalene dissolved in 400 grams of glacial acetic acid was added to 150 grams of chromic anhydride in aqueous solution contained in the same reaction vessel as mentioned in Example 1. The reaction was carried out in the same manner and under the same conditions as shown in Example 1. The yield of 2-propyl-1,4-naphthoquinone was 63.5 per cent of theory.

Example 3

Two hundred seventy-three grams of 1-hydroxy-2-nonylnaphthalene dissolved in acetic acid was added to 200 grams of chromic anhydride in aqueous solution contained in the same reaction vessel as mentioned in Example 1. The reaction temperature was maintained at about 50 degrees centigrade. The 2-nonyl-1,4-naphthoquinone separated from the reaction product had a melting point of 46–47 degrees centigrade and was obtained in a yield of 58.2 per cent of theory.

While I have shown examples of the production of representative 2-alkyl-naphthoquinones I have in similar manner produced in yields above fifty per cent of theory the following compounds: 2-ethyl-1,4-naphthoquinone; 2-butyl-1,4-naphthoquinone, melting at 46–47 degrees centigrade; 2-normalamyl-1,4-naphthoquinone, melting at 33.5–35 degrees centigrade; 2-isoamyl-1,4-naphthoquinone, melting at 50–51 degrees centigrade; 2-hexyl-1,4-naphthoquinone, melting at 51–52 degrees centigrade; 2-heptyl-1,4-naphthoquinone, melting at 47.5–48.5 degrees centigrade; 2-octyl-1,4-naphthoquinone, melting at 58.5–60 degrees centigrade; and 2-decyl-1,4-naphthoquinone, melting at 64–65 degrees centigrade.

The alkyl group in the compounds obtainable by the process herein described and claimed may be straight or branched in configuration, as above illustrated, depending upon the starting compound employed.

I claim:

1. The method which includes the steps of: adding a mixture of acetic acid and a 1-hydroxy-2-alkyl-naphthalene having the general formula: 1-hydroxy-2-$(C_nH_{2n+1})$-naphthalene, wherein "$n$" is an integer from 1 to 10, inclusive, to an aqueous solution of chromic anhydride; and, separating a 2-alkyl-1,4-naphthoquinone from the reaction product.

2. The method which includes the steps of: adding a 1-hydroxy-2-alkyl-naphthalene having the general formula: 1-hydroxy-2-$(C_nH_{2n+1})$-naphthalene, wherein "$n$" is an integer from 1 to 10, inclusive, to an oxidizing agent, the reaction being conducted in the liquid phase; and, separating a 2-alkyl-1,4-naphthoquinone from the reaction product.

3. The method which includes the steps of: adding an acetic acid solution of a 1-hydroxy-2-alkyl-naphthalene having the general formula: 1-hydroxy-2-$(C_nH_{2n+1})$-naphthalene, wherein "$n$" is an integer from 1 to 10, inclusive, to aqueous chromic anhydride in amount up to between about 1.5 and about 2.0 moles of chromic anhydride per mole of a 1-hydroxy-2-alkyl-naphthalene; and, separating a 2-alkyl-1,4-naphthoquinone from the reaction product.

4. The method which includes the steps of: adding a 1-hydroxy-2-alkyl-naphthalene having the general formula: 1-hydroxy-2-$(C_nH_{2n+1})$-naphthalene, wherein "$n$" is an integer from 1 to 10, inclusive, to an oxidizing agent while maintaining the temperature of the reaction mixture in the range between about zero degrees and about 80 degrees centigrade; and, separating a 2-alkyl-1,4-naphthoquinone from the reaction product.

5. The method which includes the steps of: reacting a 1-hydroxy-2-alkyl-naphthalene having the general formula: 1-hydroxy-2-$(C_nH_{2n+1})$-naphthalene, wherein "$n$" is an integer from 1 to 10, inclusive, with an oxidizing agent by adding the naphthalene reactant to the oxidizing reactant until the final ratio is between about 1.5 and about 2.0 moles of oxidizing agent per mole of a 1-hydroxy-2-alkyl-naphthalene; maintaining the temperature of the reaction mixture in the range between about zero degrees and about 80 degrees centigrade; and, separating a 2-alkyl-1,4-naphthoquinone from the reaction product.

6. The method according to claim 5 wherein the temperature is maintained in a range between about 15 degrees and about 55 degrees centigrade.

7. The method according to claim 5 wherein the temperature is maintained in a range between about 35 degrees and about 50 degrees centigrade.

WILLIAM M. ZIEGLER.

REFERENCES CITED

The following references are of record in the file of this patent:

Miller, Ber. Deut. Chem., vol. 14, pp. 1600–1602 (1881).